Nov. 25, 1952     O. A. NEALE     2,619,174
APPARATUS FOR HIGH-SPEED CUTTING OF CYLINDRICAL METAL MEMBERS
Filed Feb. 26, 1949     4 Sheets-Sheet 1

INVENTOR
OLIVER A. NEALE
BY
ATTORNEY

Nov. 25, 1952    O. A. NEALE    2,619,174
APPARATUS FOR HIGH-SPEED CUTTING OF CYLINDRICAL METAL MEMBERS
Filed Feb. 26, 1949    4 Sheets-Sheet 2

INVENTOR
OLIVER A. NEALE
BY
ATTORNEY

Nov. 25, 1952     O. A. NEALE     2,619,174
APPARATUS FOR HIGH-SPEED CUTTING OF CYLINDRICAL METAL MEMBERS
Filed Feb. 26, 1949     4 Sheets-Sheet 3

INVENTOR
OLIVER A. NEALE
BY *J. P. Moran*
ATTORNEY

Patented Nov. 25, 1952

2,619,174

UNITED STATES PATENT OFFICE 2,619,174

APPARATUS FOR HIGH-SPEED CUTTING OF CYLINDRICAL METAL MEMBERS

Oliver A. Neale, Beaver Falls, Pa., assignor to The Babcock & Wilcox Company, New York, N. Y., a corporation of New Jersey Application February 26, 1949, Serial No. 78,484

13 Claims. (Cl. 164—60)

This invention relates to high speed metal cutting apparatus and, more particularly, to such apparatus for severing sections from cylindrical metal membtrs, such as tubes and pipes for example.

Various arrangements have been used or proposed for cutting cylindrical metal work members to predetermined lengths. For example, machines have been used which rotate the workpiece in engagement with a fixed tool. Such machines have not been satisfactory for use in the production line cutting of steel tubing, for example, and it has been proposed in such applications to hold the work against rotation and revolve the tools around the work.

The revolving tools exert a centrifugal force proportional to their mass and the square of their velocity. To force the tools to cut into the work, much effort is required to overcome the centrifugal force, which means an uneconomical use of power in the cutting operation. Consequently, attempts have been made to balance the centrifugal force of the revolving tools by springs or the like, but these attempts have not been satisfactory from the practical standpoint.

Another factor which has hindered the development of high speed rotary cutting apparatus is the problem of balancing the tools at high speeds. Even a slight static unbalance of the tools is greatly magnified when the tools are rapidly revolved. The unbalancing detracts from the accuracy of the cut, so that it is difficult to cut successive tube sections, for example, to the same length within close tolerances. Additionally, in prior art machines of the revolving cutter type, the stability has been deleteriously affected by the location of the radial thrust support at a substantial distance from the tool pressure point. The foregoing deficiencies in prior art cutting machines have prevented full advantage being taken of the production line cutting possibilities of high speed cutting tools.

In contrast, the apparatus of the present invention includes a hollow stationary spindle having a tool carrying head rotatably mounted thereon. The tools are slidably mounted on the forward face of the head for substantially radial reciprocation toward and away from the work and each tool is linked, as by a bell crank, to a counterweight slidably mounted for radial movement in the head in relatively close axially spaced relation to the tool. Due to the interconnecting linkages, and as the counterweights have masses substantially equal to those of the tools and their supports, the counterweights substantially balance the centrifugal force of the tools and supports. Consequently the force required to engage the tools with the work is only the net force required to bite the tools into the work. This force is exerted by an axially movable feed ring engaged with the bell cranks. Advance of the feed ring moves the tools toward the work and retraction of the ring positively retracts the tools from the work.

Within the hollow stationary spindle is mounted a collet chuck comprising substantially telescoped inner and outer non-rotatable cylindrical collets. The inner collet is longitudinally fixed and receives the member to be cut, its fixed position contributing to the accuracy of setting the member with respect to the tools to assure cutting to a predetermined length. The outer collet is longitudinally movable to clamp the inner collet against the work member.

Such clamping of the work member is effected at a zone immediately adjacent the pressure point of th tools, and in radial alignment with a radial bearing rotatably supporting the cutting head on the fixed hollow spindle, this bearing being axially intermediate the tools and the counterweights. Thus, effective rigid support for the revolving tools is provided at a zone immediately adjacent the tool pressure point. This enhances the rotational stability for the cutting head, contributing substantially to the accuracy of the cut.

A feature of the invention is the location of the carbide tipped cutting tools for movement in two axially spaced radial planes. With this arrangement, a sample ring may be cut from a tube at the same time as the latter is being cut to a predetermined length. Quite a few customers require such sample rings from one or both ends of a tube length.

The operation of the apparatus is fully automatic once it has been manually initiated by depressing a "start" push button. With the tube accurately positioned in the inner stationary collet, the outer collet is automatically drawn longitudinally to clamp the tube. At the limit of clamping, the tools are rapidly moved toward the work and then moved inwardly at a controlled rate to make the cut. At the end of a predetermined depth of cut, the tools are automatically and positively retracted and the collet chuck is automatically released, completing the operational sequence.

With the foregoing in mind, it is an object of this invention to provide an efficient high speed cutting apparatus for cylindrical members such as metal tubes.

Another object is to provide such an apparatus including fully mass counter-balanced revolving cutting tools having carbide tips.

A further object is to provide such an apparatus including a stationary hollow supporting spindle rotatably supporting a cutting head and having a non-rotatable collet chuck therein, including a fixed tube-positioning collet.

Still another object is to provide such an apparatus including rigid support for the cutting head at a zone immediately adjacent the tool pressure point and at the point of clamping the work in the collet chuck.

Yet another object is to provide such an apparatus in which the operational sequence is automatically performed responsive to a manual initiation.

These and other objects, advantages, and novel features of the invention will be apparent from the following description and the accompanying drawings. In the drawings.

Figure 1:
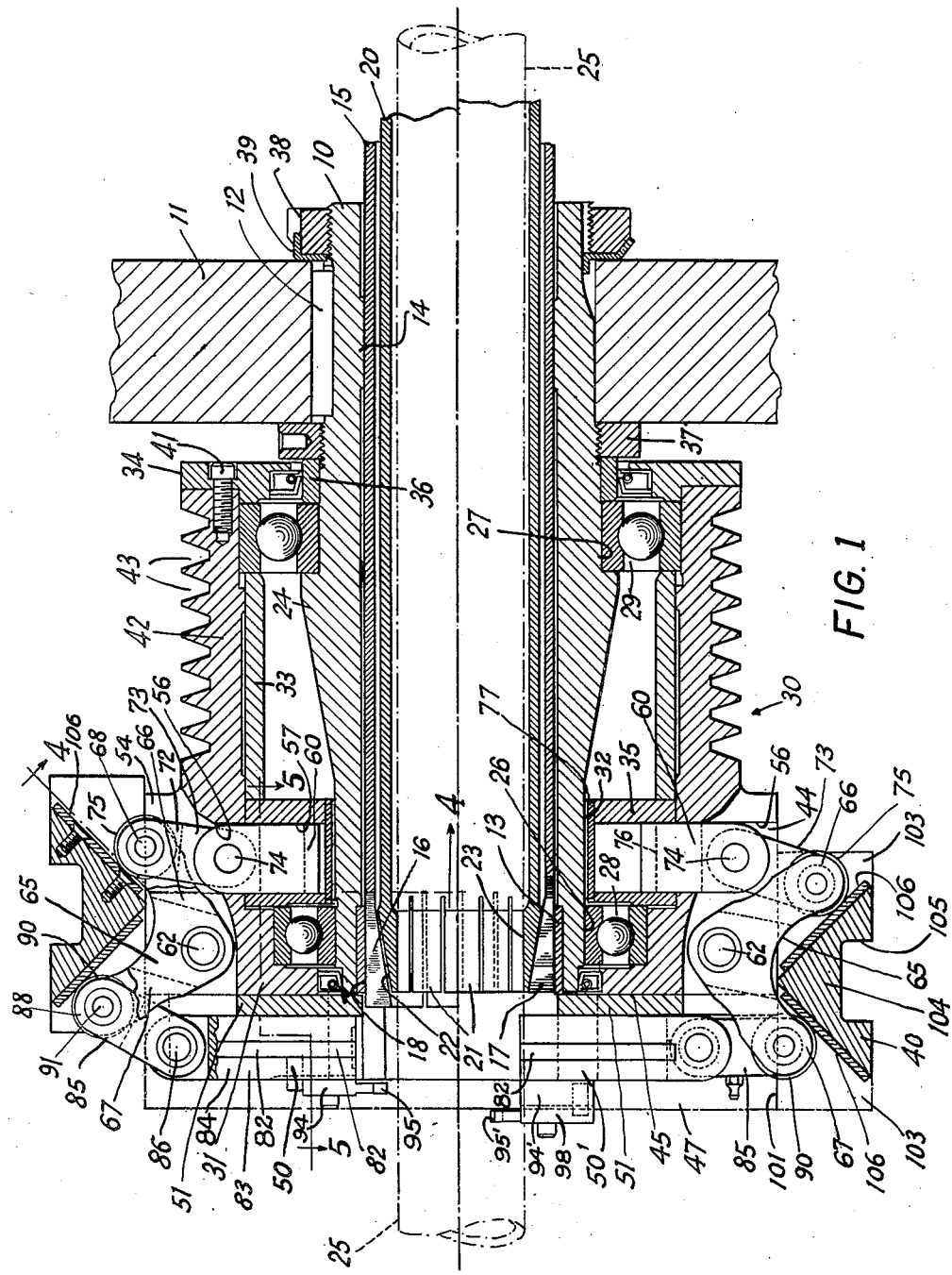
Fig. 1 is an axial sectional view through cutting apparatus embodying the invention, with the lower half of the figure showing the tool feeding means in advanced position and the upper half showing such means retracted.

Referring to Fig. 1, the cutting apparatus includes a stationary hollow supporting spindle 10 which is mounted, at its rear end, in a fixed support 11 and held against rotation by a key 12. A non-rotatable, longitudinally movable substantially cylindrical collet 15 is mounted within spindle 10, and slidably bears within a guide ring 13 at the forward end of spindle 10 and an annular inner shoulder 14 near the rear end of the spindle. Between ring 13 and shoulder 14, and rearwardly of the latter, collet 15 is spaced from spindle 10 to reduce frictional resistance.

The forward end of collet 15 is longitudinally slotted and gradually reduced in inner diameter to form a series of circumferentially spaced, wedge fingers 16 having sloping inner surfaces 17. These fingers overlap and cooperate with the outer sloping surfaces 22 of thickened wedge fingers 21 formed in the forward end of a non-rotatable, longitudinally stationary and substantially cylindrical inner collet 20. The latter is mounted within and in radially spaced relation to collet 15, so that the two collets are telescopically associated although not in surface engagement with each other except at their fingers when clamped on a workpiece. It should be noted that the outer surfaces 18 of fingers 16 are parallel to and engage the inner surface of ring 13.

Figure 2:
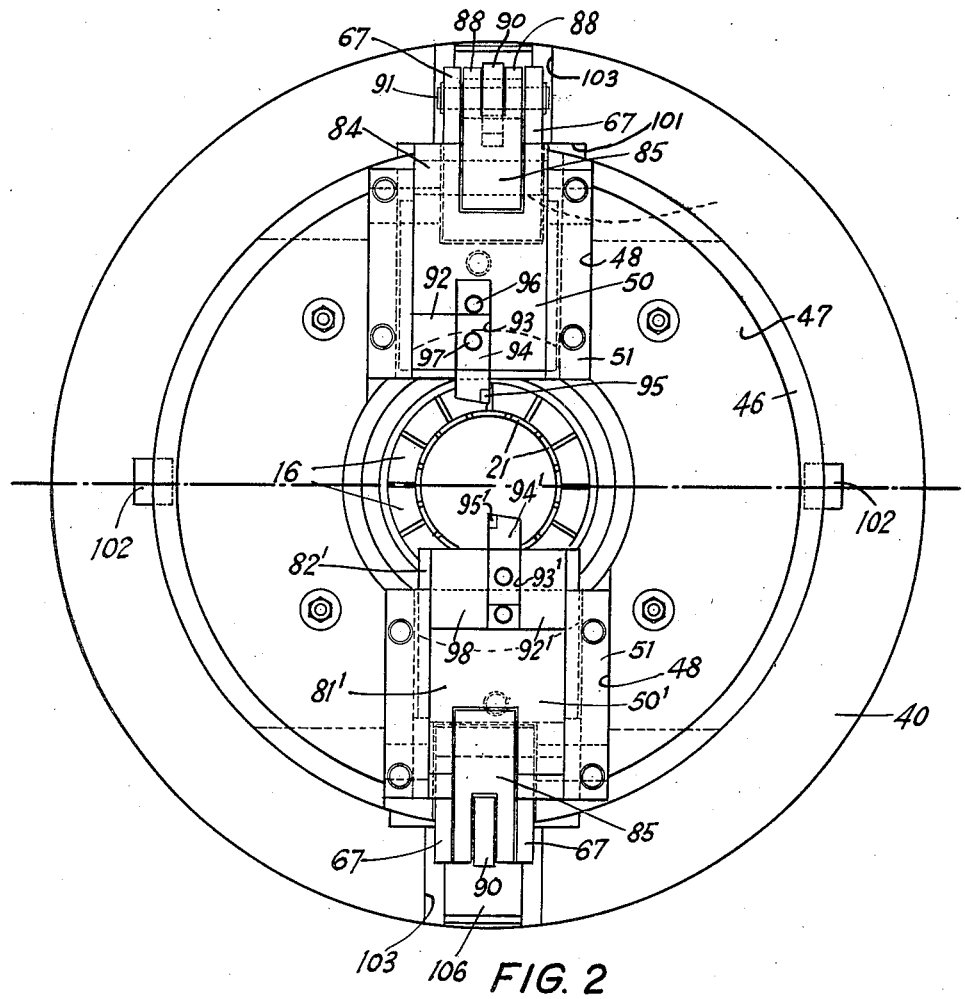
Fig. 2 is a front elevation view of the apparatus, showing the feeding means in the two positions as in Fig. 1.

The inner surfaces 23 of fingers 21 are substantially parallel to the inner surface of ring 13 and also to the outer surface of a cylindrical metal work member, such as tube 25. It will be seen that, when movable collet 15 is drawn to the right as viewed in Fig. 1, fingers 16 will wedge fingers 21 against tube 25 to clamp the latter in longitudinally fixed, non-rotatable relation. The fixed inner collet 20 provides for accurate presetting of tube 25 with relation to the cutting head, so that the tube may be cut accurately to a predetermined length, or annular sections of an accurately predetermined length may be cut from the tube. The uniform clamping action is facilitated by the circumferentially relatively staggered relation of fingers 16 and 21 (see Figs. 1 and 2), with each finger 16 overlapping two adjacent fingers 21. The arrangement of collets 15 and 20 forms what may be called a "collet chuck," which term will be used hereinafter to designate these two collets jointly.

Stationary spindle 10 has a forward outer bearing surface 26 and a second outer bearing surface 27 immediately forward of key 12, and these bearing surfaces carry anti-friction bearings 28 and 29, respectively, supporting rotatable cutter head 30 on spindle 10. Head 30 has a forward radial flange 31 embracing bearing 28 and, rearwardly of flange 31, has a radially enlarged elongated recess 32 forming, with flange 31, a forward recess receiving a guide ring 35 seated against the outer race of bearing 28, and described more in detail hereinafter. A spacer sleeve 33 abuts ring 35 and the outer race of bearing 29, the inner race of this bearing seating against a shoulder 24 on spindle 10 to properly position head 30 on the spindle. A back plate 34, secured to head 30, holds the outer race of bearing 29 against sleeve 33, and the inner race is engaged by a clamp ring 36 held in position on spindle 10 by a lock nut 37. The latter is engaged by support 11, and spindle 10 is locked against axial movement in the support by a lock nut 38 and a lock washer 39. Head 30 may be easily removed from spindle 10, for inspection, repair, or replacement by disengaging cap screws 41 which secure plate 34 to head 30. Suitable bearing seals and seal rings are provided as indicated.

Head 30 has a rearward cylindrical sleeve section 42 embracing ring 35, space 33 and bearing 29, and section 42 has its external surface formed with V-grooves 43 to provide a multiple V-groove belt driven pulley. The forward section 44 of head 30 is likewise cylindrical to form a bearing surface for a feed ring 40, and section 44 is somewhat larger in diameter than section 42. The forward face 45 of head 30 has a discontinuous circular rim 46 (Fig. 2) bounding an axially extending recess 47 of substantial depth.

The forward face 45 of head 30 acts as a mounting support for the reciprocable cutting tools which, in the present case comprise carbide cutting tips or blocks 95, 95'. For this purpose, face 45 has secured thereto, on opposite sides of its axis, shoes 51, 51 which slidably support reciprocable tool holders 50, 50' on which tips 95, 95' are mounted. Each tool holder is connected by linkage, including bell cranks 65, 65, to counterweights 60, 60, each mounted for reciprocation in radially aligned pockets in ring 35 and head 30. The bell cranks are pivoted on head 30 for swinging movement in an axial plane so as to effect relative reverse radial movement between each tool holder and its connected counterweight. The feed ring 40 is engaged with the bell cranks, to swing the latter to reciprocate the tool holders and their connected counterweight, in a manner described hereinafter.

More specifically, forward face 45 has two relatively deep grooves 48, 48, preferably rectangular in cross section, which are on opposite sides of the center of the plate and parallel to a diameter of the face, but centered equal distances to opposite sides of such diameter. These grooves act as seating recesses for fixedly mounting the shoes 51, 51 which slidably support the reciprocable tool holders 50, 50'. Shoes 51, 51 are channel shape in cross section and have slots 52, 52 extending centrally along the inner surfaces of flanges 53, 53 for a purpose to be described.

A pair of radial slots 54, 54 are cut through the periphery of section 44 and aligned with the opposite ends of the aforementioned diameter of face 45. Slots 54, 54 intersect grooves 48, 48 at their forward ends and intersect rectangular radial pockets 56, 56 at their rearward ends, extending beyond pockets 56 to the rear surface of section 44. Pockets 56, 56 are diametrically aligned with and form continuations of rectangular radial pockets 57, 57 in guide ring 35 to receive the counterweights 60, 60.

Figure 3:
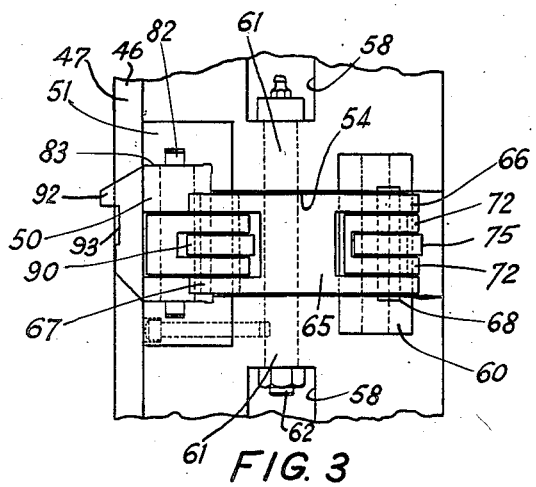
Fig. 3 is a partial top plan view of the forward end of the apparatus, with the feed ring removed.
Figure 4:
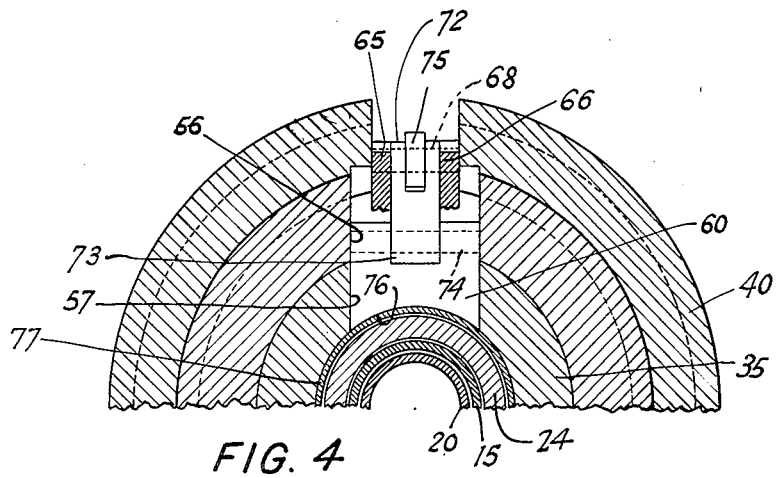
Fig. 4 is a radial sectional view of the apparatus on the line 4—4 of Fig. 1, looking in the direction of the arrows.
Figure 5:
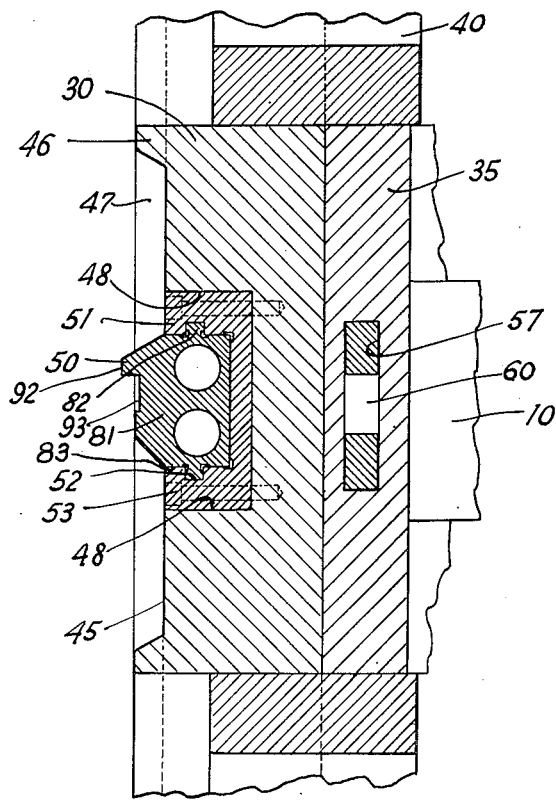
Fig. 5 is a partial horizontal sectional view of the apparatus on the line 5—5 of Fig. 1.

A pair of spaced circumferential slots 59, 59 (Fig. 3) extend toward each radial slot 54 so as form ears 61, 61 on each side of a slot 54 bored to receive hinge pins 62, 62 each oscillatably mounting a bell crank 65 having forked arms 66, 67. The forked end of each rear arm 66 carries a pin 68 which seats in the forked arms 72 of a link 73. Intermediate arms 72, each pin 68 carries a roller 75 engaging feed ring 40. The opposite end of each link 73 receives a pin 74 mounted in the forked outer end of counterweight 60. These latter are rectangular in cross section to move inwardly and outwardly in radially aligned pockets 56, 57, and the inner ends 76 of the counterweights are arcuate so as to have clearance over a cylindrical sealing ring 77, on the inner surface of guide ring 35 and sealing the inner ends of pockets 57.

Tool holder 50 comprises an elongated rectangular body portion 81 having rectangular ribs 82 extending along a pair of opposite sides 83 and slidably received in opposing grooves 52 of a shoe 51. At its outer end, tool holder 50 has a pair of spaced arms 84 carrying a pin 86 received in the inner end of a link 85 having forked arms 88. Arms 88 carry a pin 91 mounted in the forked arm 67 of a bell crank 65. A roller bearing 90 is mounted between each pair of arms 88 and is engaged by feed ring 40 as described hereinafter.

The radially inner front face of holder 50 carries a forwardly projecting elongated rib 92 adjacent which is a shallow rectangular recess 93. The tool 94 is set in recess 93 and against rib 92, having its outer end receiving a pin 96 in the recess and being held in proper alignment by a screw 97. The inner work facing corner of tool 94 carries a suitable carbide cutting tip 95, which is cemented or otherwise held in place.

Tool holder 50' is, in most respects, identical to holder 50, and corresponding parts have been given the same reference numerals primed. However, its inner forward face carries an axially extended portion 98 so that its axial thickness is about ½ to ⅝ inch more than that of holder 50. This offset carries rib 92' and recess 93' seating tool 94'. The result is that the cutting tip 95' is axially offset about ½ inch to ⅝ inch beyond tip 95 so that, in operation of the apparatus, a sample ring of such width is cut from the tube 25 at the same time as the tube end is trimmed. It will be noted that the forward corners of cutting tips 95, 95' lie in a common axial plane of the work.

With the apparatus as so far described, and with counterweights 60 having substantially the same mass as the tools and tool holders, the counterweights will balance the centrifugal force of the tools and tool holders when head 30 is rotated. Thus, to feed tools 94, 94' inwardly, the amount of force necessary is decreased by the amount of the centrifugal force normally exerted by the tools and tool holders. In other words, the only force required is that necessary to cause bits 95, 95' to cut into tube 25. Furthermore, cutting tips 95, 95', due to the axial extension of tool holder 50', are axially spaced so as to cut a ring from tube 25 as well as to cut the tube to size.

The means for exerting such force comprises the feed ring 40, which is rectangular in cross section and has an inner surface 101 slidably engaging the outer surface of section 44 of ring 30. Keys 102 constrain feed ring 40 to rotate with ring 30. Ring 40 has a pair of diametrically aligned slots 103, 103 in its inner surface, each slot being substantially rectangular in cross section and aligned with a bell crank 65 whose arms extend outwardly into the slot. Intermediate the ends of each slot 103 is a radially inwardly directed cam 104, illustrated in Fig. 1 as being triangular in axial cross section and centered relative to a circumferential channel 105 in the outer surface of ring 40. In the present instance, the apex angle of each triangular cam 104 is 90°, and the sides of the cam carry wear plates 106, 106 each continuously engaging a roller 75 or 90. Thus, as ring 40 is moved axially, cam wear surfaces 106 move rollers 75 or 90 to swing bell cranks 65 to advance or retract holders 50, 50' and tools 94, 94', and effect radially reversed movement of counterweights 60, 60. It should be understood that, while only a pair of counterbalanced tools have been described, more than two may be used if necessary or desirable, all of the tools being so angularly related on face 45 that dynamic balance of head 30 is attained.

Figure 6:
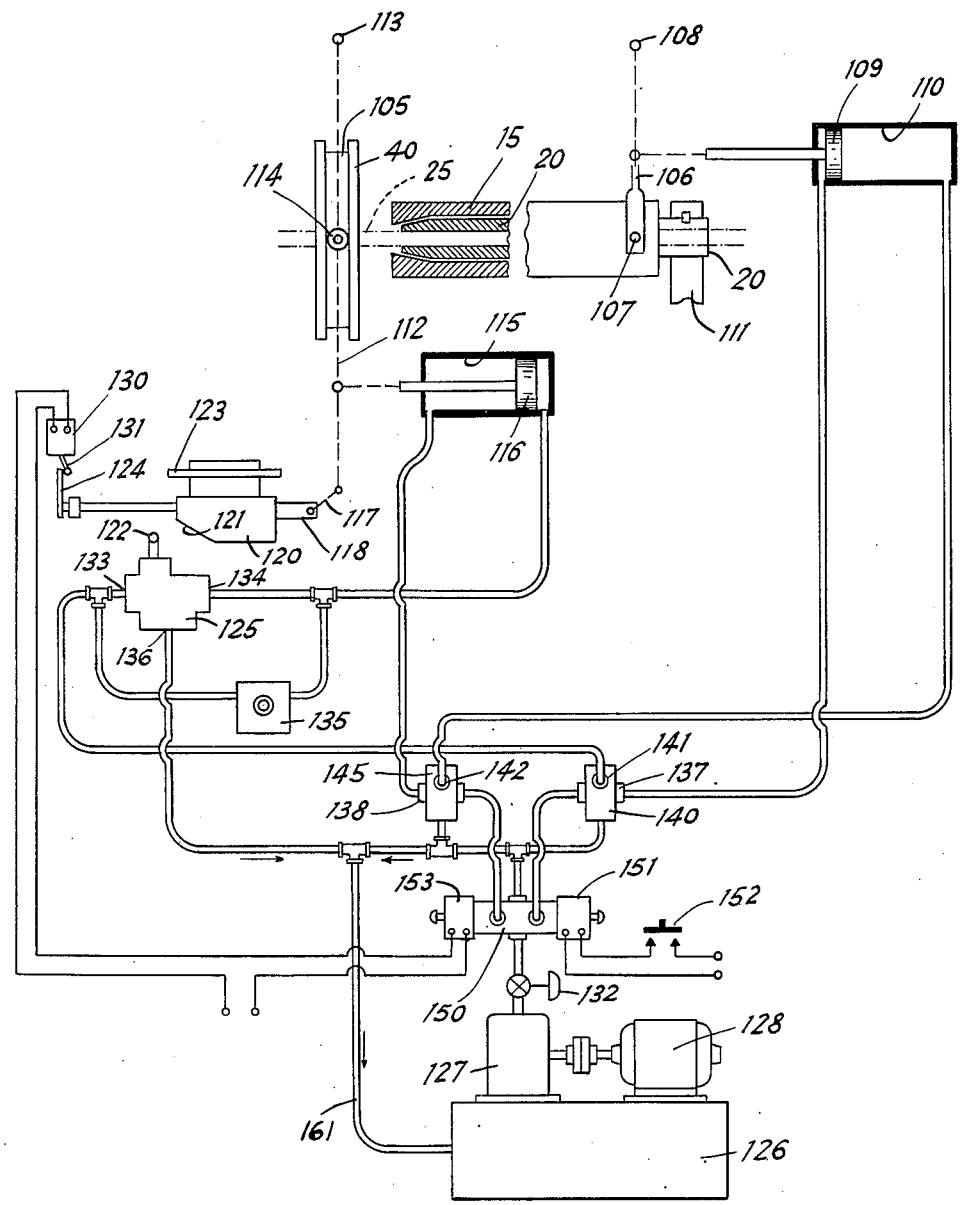
Fig. 6 is a schematic diagram illustrating an automatic control system for the apparatus.

The operation of the apparatus will be understood best by reference to Fig. 6 which schematically illustrates the hydraulic and electrical control system. Head 30 is rotated from a suitable power source through the medium of one or more multiple V-belts engaging grooves 43, and collet chuck 15, 20 is normally in the position shown in the upper half of Fig. 1. With the collet chuck so arranged, tube 25 is placed in the apparatus and accurately positioned by reference to the forward end of stationary collet 20.

As schematically shown in Fig. 6, inner, stationary collet 20 is locked against longitudinal and transverse movement by securement in a fixed support 111 which may comprise part of support 11 of Fig. 1. Outer, longitudinally movable collet 15 may have the forked end of a lever 106 connected thereto by pins 107, lever 106 being pivotally secured to a fixed surface as at 108. The rod of a piston 109 of a hydraulic cylinder 110 is connected to an intermediate point of lever 106 so that, when piston 109 moves to the right, the collet chuck is clamped onto tube 25 to hold the latter in fixed position as shown in the lower half of Fig. 1. When piston 109 moves to the left, the collet chuck releases tube 25 for withdrawal from the apparatus.

Feed ring 40 is moved axially by a lever 112, which is pivoted to a fixed surface at 113 and may have a ring or fork carrying rollers 114 engaged in external channel groove 105 of feed ring 40. The rod of a piston 116 of a hydraulic cylinder 115 is secured to lever 112 beyond groove 105. As piston 116 moves to the left, feed ring 40 is moved axially to swing bell cranks 65 to feed the tools toward the work and, as piston 116 moves to the right, feed ring 40 is moved axially to swing bell cranks 65 to withdraw the tools from the work.

The feeding of the tools toward the work is effected automatically in response to clamping of tube 25 in the collet chuck, and at a predetermined rate and in a presettable amount. Likewise, the tools are automatically withdrawn and the collet chuck automatically disengaged in response to completion of the desired cut. For this purpose, a link 117 connects the free end of lever 112 to a rod 118 secured to a longitudinally movable operator 120. The latter has a bevelled forward edge 121 for controlling the operator 122 of a shut-off valve 125.

Operator 120 also controls the operation of a double throw limit switch 130. For this purpose, operator 120 carries a longitudinally adjustable rod or plate 123 which, as operator 120 moves to the left, engages switch handle 131 to close switch 130. When operator 120 moves to the right, switch handle 131 is reversed, to open switch 130, by an abutment 124 adjustably mounted on the forward end of rod 118.

The control system further includes an adjustable feed control valve 135 in shunt relation with shut-off valve 125, and sequence valves 140, 145 which receive fluid under pressure from a 4-way valve 150 operated by a solenoid 151 controlled by a push button 152, and a solenoid 153 controlled by limit switch 130. Hydraulic fluid is delivered to valve 150 from a reservoir 126 by a pump 127 driven by a motor 128. Fluid is returned to reservoir 126 through a return line 161 connected to valves 125, 140, 145 and 150. System pressure is controlled by a pressure regulator 132.

The several valves 125, 135, 140, 145 and 150 are standard, commercially available valves. Shut-off valve 125 provides for free flow of fluid from left port 133 to right port 134 as long as operator 122 is not depressed. When operator 122 is engaged by edge 121, valve 125 shuts off flow of fluid from left to right. This valve also provides for free flow of fluid from right port 134 to return line 131 through port 136. Valve 135 is a throttling valve for controllably governing the rate of fluid flow therethrough. Sequence valves 140, 145 are set at a pressure lower than the system pressure and, until the set pressure is exceeded, deliver fluid to their respective side ports 137, 138. When the pressure exceeds the setting of the valves, fluid is delivered to the respective front ports 141, 142.

With the described arrangement, and with tube 25 located in collet 20 as described, the driving means (not shown) for cutter ring 30 is energized to rotate the latter, and push button switch 152 is closed. This energizes solenoid 151 to move valve 150 to a position delivering fluid under pressure to sequence valve 140 and exhausting fluid from sequence valve 145. Valve 140 delivers fluid to the left end of cylinder 110, causing piston 109 to move to the right drawing collet 15 to the right relative to stationary collet 20. Teeth 16 wedge teeth 21 against tube 25 to clamp tube 25 in a fixed position. When piston 109 can move no further to the right, as when the collet chuck is fully engaged, pressure builds up above the pre-set value in valve 140 causing this valve to shift its delivery to front port 141.

The hydraulic fluid now flows from port 141 freely through shut-off valve 125 to the right end of cylinder 115. Piston 116 moves relatively rapidly to the left, causing lever 112 to swing clockwise and move feed ring 40 and operator 120 to the left. Ring 40 swings bell cranks 65 to move the tools inwardly toward tube 25 but, before the tools are fully engaged with the work, beveled surface 121 of operator 120 depresses handle 122 of valve 125 to shut this valve. The fluid must now flow at a controlled rate through feed rate control valve 135, which may be set for the desired rate of feed.

The tool feed into the work continues at the controlled pre-set rate until plate or rod 123 strikes switch handle 131. This action is adjustable, to pre-set the depth of the cut, by adjusting rod or plate 123 longitudinally of operator 120. When handle 131 is so operated, switch 130 is closed to energize solenoid 153 to move valve 150 to a position connecting sequence valve 145 to pressure and sequence valve 140 to exhaust. Valve 145 delivers pressure fluid through its port 138 to the left end of cylinder 115, moving piston 116 to the right. The fluid behind piston 116 exhausts through valve 125 to return line 131.

Piston 116 relatively rapidly swings lever 112 counterclockwise to move feed ring 40 to the right, swinging bell cranks 65 to positively retract the tools from the work. As ring 40 reaches its limit of movement, abutment 124 kicks handle 131 to open switch 130, and pressure builds up behind piston 116 causing sequence valve 145 to shift its delivery to port 142. Pressure fluid is now delivered to the right end of cylinder 110, moving piston 109 to the left. Lever 106 moves outer collet 15 to the left to release the collet chuck from tube 25, completing the sequence.

As the reciprocable tools and tool holders are rapidly revolved around the work by head 30, their centrifugal force is substantially balanced by the revolving counterweights 60 through the medium of bell cranks 65. Consequently, the force applied to feed ring 40 need be only as much as needed to force the carbide cutting tips into the work. Both the advance and retraction of the tools are positive, and no springs are relied upon.

The stationary spindle 10 gives perfect support to rotating head 30, as the radial bearing 28 is close to the tool pressure point. Additionally, the gripping action of the collet chuck 15—20 takes place in alignment with bearing 28, giving a very rigid support to tube 25 close to the tool pressure point. The stationary collet 20 provides for accurate adjustment of the work to close tolerances for the cut length.

With the arrangement of axially spaced carbide tips as shown, a sample ring is cut from the tube at the same time as the tube is cut to proper length. Such samples, from one or both ends of the tube, are frequently required by purchasers. However, the tools can be axially aligned and adjusted to speed the cut, and more than two tools may be used if necessary or desirable. The apparatus comprises a rapid and efficient cut-off arrangement for cylindrical work members such as tubes or bars, and the operation, when initiated, is carried out in an automatic sequence. Also, cutting tip 95' may be so mounted as to be spaced radially inwardly relative to tip 95 so that the tube end is cut off before tip 95 cuts through to sever the sample ring.

While a specific embodiment of the invention has been shown and described in detail to illustrate the invention principles, it should be understood that the invention may be otherwise embodied without departing from such principles.

I claim:

1. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; and an operator connected to said element to so move the latter.

2. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head in axially spaced alignment with said cutting means; linkage pivoted on said head and interconnecting said cutting means and said mass means for reversely directed radial movement on said head whereby the centrifugal forces of said cutting means and said mass means counteract each other during rotation of said head; an element mounted on said head for axial movement thereon and engaged with said linkage to move the latter to effect radial movement of said cutting means toward and away from the member to be cut to effect a cut in said member; and an operator connected to said element to so move the latter.

3. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; an operator connected to said element to so move the latter; and speed control mechanism in controlling relation with said operator and constructed and arranged to selectively control the rate of operation of said operator.

4. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; a feeding element movably mounted on said head and engaged with said linkage to move the latter to effect radial movement of said cutting means toward and away from the member to be cut to effect a cut in said member; an operator connected to said element to so move the latter; and control mechanism operatively connected to said operator and constructed and arranged to actuate the latter to move said element and including a device operable by said mechanism, at the completion of a cut to condition said mechanism to actuate said operator to move said feeding element to retract said cutting means from the work.

5. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head in axially spaced alignment with said cutting means; link means pivotally mounted on said head axially intermediate and connected to said cutting means and said mass means and oscillatable in an axial plane for effecting reversely directed radial movement of said cutting means and said mass means on said head whereby the centrifugal forces of said cutting means and said mass means counteract each other during rotation of said head; an element mounted on said head for axial movement thereon and engaged with said linkage to move the latter to effect radial movement of said cutting means toward and away from the member to be cut to effect a cut in said member; and an operator connected to said element to so move the latter.

6. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head in axially spaced alignment with said cutting means; link means pivotally mounted on said head axially intermediate and connected to said cutting means and said mass means and oscillatable in an axial plane for effecting reversely directed radial movement of said cutting means and said mass means on said head whereby the centrifugal forces of said cutting means and said mass means counteract each other during rotation of said head; an element mounted on said head for axial movement thereon and engaged with said linkage to move the latter to effect radial movement of said cutting means toward and away from the member to be cut to effect a cut in said member; an operator connected to said element to so move the latter; and speed control mechanism in controlling relation with said operator and constructed and arranged to selectively control the rate of operation of said operator.

7. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head in axially spaced alignment with said cutting means; link means pivotally mounted on said head axially intermediate and connected to said cutting means and said mass means and oscillatable in an axial plane for effecting reversely directed radial movement of said cutting means and said mass means on said head whereby the centrifugal forces of said cutting means and said mass means counteract each other during rotation of said head; a feeding element mounted on said head for axial movement thereon and engaged with said linkage to move the latter to effect radial movement of said cutting means toward and away from the member to be cut to effect a cut in said member; an operator connected to said element to so move the latter; and control mechanism operatively connected to said operator and constructed and arranged to said operator to move said feeding element to retract said cutting means from the work.

8. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; an operator connected to said element to so move the latter; and control mechanism operatively connected to said operator and said holding means and including a control element manually operable to initiate operation of said control mechanism, a first actuator connected to said holding means and operatively associated with said control element, said first actuator, responsive to operation of said control element, actuating said holding means to grip the member, and a second actuator connected to said operator and operatively associated with said first actuator, said second actuator, responsive to operation of said first actuator to actuate said holding means, moving said operator to advance said cutting means toward the member to be cut.

9. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; an operator connected to said element to so move the latter; and control mechanism operatively connected to said operator and said holding means and including a control element manually operable to initiate operation of said control mechanism, a first actuator connected to said holding means and operatively associated with said control element, said first actuator, responsive to operation of said control element, actuating said holding means to grip the member, a second actuator connected to said operator and operatively associated with said first actuator, said second actuator, responsive to operation of said first actuator to actuate said holding means, moving said operator to advance said cutting means toward the member to be cut, and adjustable control means operatively associated with said second actuator and operable thereby, after a pre-selected advance of said cutting means, to condition said second actuator to move said operator to retract said cutting means.

10. Apparatus for effecting an annular cut in a substantially cylindrical metal member comprising, in combination, a pair of telescopically related, non-rotatable clamping means arranged to receive a member to be cut and hold the same against rotation; a cutting head rotatably mounted on said clamping means; cutting means mounted for substantially radial movement on said head; mechanism operative to rotate said head; elements rotatable with said head and movable inwardly and outwardly thereon; linkage interconnecting said cutting means and said elements for reversely related movement relative to said head whereby said elements are effective to substantially counterbalance the centrifugal force of the revolving cutting means; actuating means operative to effect relative longitudinal movement of said clamping means to grip the member to be cut; means movable axially of said head and cooperative with said linkage to advance said cutting means toward the member to effect a cut therein; means responsive to such gripping of the member to be cut to move said axially movable means to advance said cutting means into engagement with the member at a relatively rapid rate; and feeding means operable, after the cutting means are engaged with the member, to advance the cutting means into the member at a controlled adjustable rate.

11. Apparatus for effecting an annular cut in a substantially cylindrical metal member comprising, in combination, a pair of telescopically related, non-rotatable clamping means arranged to receive a member to be cut and hold the same against rotation; a cutting head rotatably mounted on said clamping means; cutting means mounted for substantially radial movement on said head; mechanism operative to rotate said head; elements rotatable with said head and movable inwardly and outwardly thereon; linkage interconnecting said cutting means and said elements for reversely related movement relative to said head whereby said elements are effective to substantially counterbalance the centrifugal force of the revolving cutting means; actuating means operative to effect relative longitudinal movement of said clamping means to grip the member to be cut; means movable axially of said head and cooperative with said linkage to advance said cutting means toward the member to effect a cut therein; means responsive to such gripping of the member to be cut to move said axially movable means to advance said cutting means into engagement with the member at a relatively rapid rate; feeding means operable, after the cutting means are engaged with the member, to advance the cutting means into the member at a controlled adjustable rate; and means operable automatically in response to completion of a cut to retract said cutting means.

12. Apparatus for effecting an annular cut in a substantially cylindrical metal member comprising, in combination, holding means arranged to receive and hold the member to be cut; a cutting head rotatably mounted on said holding means; mechanism operative to rotate said head; cutting means mounted for substantially radial movement on said head; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; an operator connected to said element to so move the latter; and control mechanism operatively connected to said operator and said holding means and including a control element manually operable to initiate operation of said control mechanism, a first actuator connected to said holding means and operatively associated with said control element, said first actuator, responsive to operation of said control element, actuating said holding means to grip the member, a second actuator connected to said operator and operatively associated with said first actuator, said second actuator, responsive to operation of said first actuator to actuate said holding means, moving said operator to advance said cutting means toward the member to be cut at a relatively rapid rate until said cutting means engage the member to be cut, adjustable feed regulating means associated with said second actuator to control the feeding rate of said feeding means, a device operable by said second actuator and operable thereby, when said cutting means engage the member to be cut, to condition said regulating means to regulate the rate of operation of said second actuator, and adjustable control means operatively associated with said second actuator and operable thereby, after a preselected advance of said cutting means, to condition said second actuator to move said operator to retract said cutting means, said first actuator, responsive to operation of said second actuator to retract said feeding means, operating said holding means to release the cut member.

13. Apparatus for effecting an annular cut in a substantially cylindrical metal member comprising, in combination, holding means arranged to receive and hold the member to be cut; a cutting head rotatably mounted on said holding means; mechanism operative to rotate said head; a pair of cutting means mounted for substantially radial movement on said head in axially spaced relation to each other; mass means mounted for linear radial reciprocation on said head; linkage pivoted on said head and interconnecting said cutting means and said mass means for reversely directed radial movement on said head whereby the centrifugal forces of said cutting means and said mass means counteract each other during rotation of said head; an element movably mounted on said head and engaged with said linkage to move the latter to effect radial movement of said cutting means toward and away from the member to be cut to effect a cut in said member; and an operator connected to said element to so move the latter to advance both cutting means simultaneously toward the member to be cut to effect a pair of axially spaced cuts thereon.

OLIVER A. NEALE.

REFERENCES CITED

The following references are of record in the file of this patent:

UNITED STATES PATENTS

| Number | Name | Date |
|---|---|---|
| 1,306,588 | France | June 10, 1919 |
| 1,592,933 | Hammond et al. | July 20, 1926 |
| 2,018,523 | Hogg | Oct. 22, 1935 |
| 2,112,396 | Corrigan | Mar. 29, 1938 |
| 2,267,543 | Watson | Dec. 23, 1941 |
| 2,459,075 | Hibbard | Jan. 11, 1949 |
| 2,484,854 | Peters | Oct. 18, 1949 |

FOREIGN PATENTS

| Number | Country | Date |
|---|---|---|
| 402,079 | Germany | Jan. 20, 1924 |